United States Patent [19]
Gibran et al.

[11] Patent Number: 5,222,705
[45] Date of Patent: Jun. 29, 1993

[54] TRIPOD HAVING COLLAPSIBLE LEG ASSEMBLIES AND EXTENDIBLE NECK AND LATCH MECHANISMS FOR MAINTAINING LEG ASSEMBLIES AND NECK IN PREDETERMINED POSITIONS

[75] Inventors: Kahlil Gibran, 160 W. Canton St., Boston, Mass. 02118; Christian E. Casagrande, Middletown, R.I.

[73] Assignee: Kahlil Gibran, Boston, Mass.

[21] Appl. No.: 602,214

[22] Filed: Oct. 23, 1990

[51] Int. Cl.$^5$ .......................................... F16M 11/38
[52] U.S. Cl. .............................. 248/170; 248/188.6; 403/21; 403/108; 403/328
[58] Field of Search ............. 248/170, 165, 168, 166, 248/439, 173, 188.6, 188.5, 188.91, 171, 177, 178, 186; 403/21, 108, 328

[56] References Cited

U.S. PATENT DOCUMENTS

| | | | |
|---|---|---|---|
| 894,672 | 7/1908 | Leonard | 248/188.6 |
| 1,226,554 | 5/1917 | Mante | 248/170 X |
| 2,658,777 | 11/1953 | Rauglas | 248/188.5 X |
| 3,107,109 | 10/1963 | Tindale | 248/188.5 X |
| 3,980,409 | 9/1976 | Turner | 248/188.5 X |
| 4,215,839 | 8/1980 | Gibran | 248/170 |
| 4,570,886 | 2/1986 | Mooney | 248/188.6 X |
| 4,988,064 | 1/1991 | Hoshino | 248/170 |

Primary Examiner—Ramon O. Ramirez
Attorney, Agent, or Firm—Weingarten, Schurgin, Gagnebin & Hayes

[57] ABSTRACT

A collapsible and adjustable tripod for support of a camera or other apparatus is disclosed. The tripod includes a central column having three sides, each side having a channel longitudinally formed therein. Three leg assemblies, each comprising a leg member and a brace, unfold to support the tripod and collapse to a closed position within the channel in each side of the central column. A first latch mechanism associated with each leg assembly allows the top of each leg member to be slidable within each channel and lockable in a series of positions within each channel. Each brace is pivotably mounted to the bottom of the central column. A second latch mechanism allows the opposite end of each brace to be slidable along the leg member and lockable in a series of positions on each leg member. A neck telescopically extends from the top of the central column. A third latch mechanism allows the neck to be lockable in a series of positions above the top of the column.

6 Claims, 7 Drawing Sheets

TRIPOD HAVING COLLAPSIBLE LEG ASSEMBLIES AND EXTENDIBLE NECK AND LATCH MECHANISMS FOR MAINTAINING LEG ASSEMBLIES AND NECK IN PREDETERMINED POSITIONS

FIELD OF THE INVENTION

This invention relates to tripods and more particularly to a tripod which is collapsible and adjustable to intended positions.

BACKGROUND OF THE INVENTION

Tripods are used to provide a sturdy support for a camera or other apparatus. Tripods comprise a support section and three legs. The camera or other apparatus is screwed onto the support section. To accommodate use in a variety of locations, tripods are typically adjustable by adjusting the length and angle of each of the legs. The tripod is locked into the adjusted position by a friction type of locking mechanism. The legs can also typically be collapsed to a compact configuration to ease transportation of the tripod.

The tripod shown in U.S. Pat. No. 4,215,839 is readily collapsible to a particularly compact configuration. The tripod comprises a central column and legs of fixed length having upper ends slidably attached to the central column and adjustable at any position along the length thereof. An arm is associated with each leg, one end of each arm being pivotably attached to the lower portion of the central column, the other end of each arm being slidably adjustable along a portion of the respective leg. The legs are extensible by sliding along the length of the central column, while the angular extent of the leg is adjustable by slidable adjustment of the interconnecting arms. The tripod height is lengthened by rotating a threaded shaft within the central column.

SUMMARY OF THE INVENTION

The tripod of the present invention comprises a central column having three sides, each side having a channel formed therein. The column is hollow and a neck telescopically extends from an opening at the top of the column to lengthen the tripod's height. Three leg assemblies, each comprising a leg member and a brace, are each associated with a respective side of the central column. Each leg assembly is collapsible to a closed position within each channel and extendible to support the tripod stably on the ground. A first latch mechanism is associated with each leg assembly for locking each leg assembly in one of a series of positions within each channel. A second latch mechanism is associated with each leg assembly for locking each brace in one of a series of positions along a respective leg member. A third latch mechanism is provided for latching the telescoping neck in one of a series of positions extending above the top of the column. The latch mechanisms for locking the tripod into one of a series of predetermined positions provide a stronger lock than in prior art friction type locking mechanisms.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
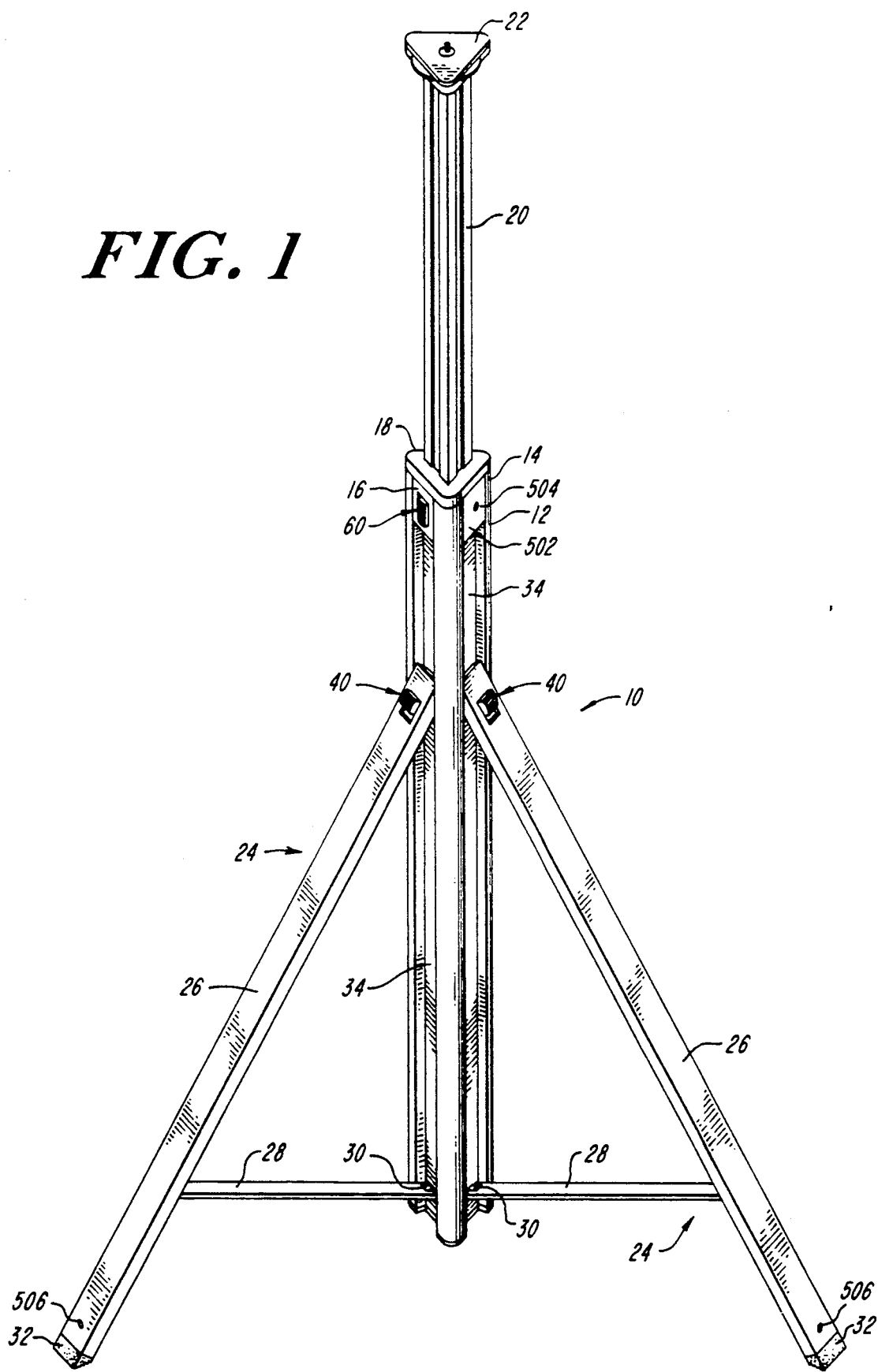
FIG. 1 a perspective view of the tripod of the present invention in an extended position.

The preferred embodiment of the tripod of the preferred embodiment of the present invention is shown generally at 10 in FIG. 1. The tripod comprises a central column 12 having three sides 14, 16, 18 forming a generally triangular cross-section. The column 12 is hollow and an extension or neck 20 is telescopable within the central column 12. A head assembly 22 is mounted at the top of neck 20.

The tripod includes three leg assemblies shown generally at 24. Each leg assembly comprises a leg member 26 and a brace 28. The brace 28 is attached at one end to the central column 12 with a pivotable attachment 30 near the bottom of the central column. The other end of the brace 28 is slidable along leg member 26 and lockable in any of a series of predetermined positions along leg 26 in a manner to be more fully described below.

Leg member 26 has a foot 32 at the bottom end thereof for resting on the ground. The opposite end of leg member 26 is slidably received within a channel 34 of each side of the central column 12. A first latch mechanism 40 is provided at the top of each leg member 26 for locking the top of the leg member into any one of a series of predetermined positions within channel 34 in a manner to be more fully described below. A second latch mechanism 50 is provided for locking each brace 28 into any one of a series of predetermined positions on the underside of each leg member also in a manner to be more fully described below. A third latch mechanism 60 is provided at the top of column 12 for locking the neck 20 into any one of series of predetermined extended positions also in a manner to be more fully described below. The latch mechanisms with the associated predetermined positions provide a stronger lock against accidental slippage than in prior art friction locking mechanisms.

Figure 2:
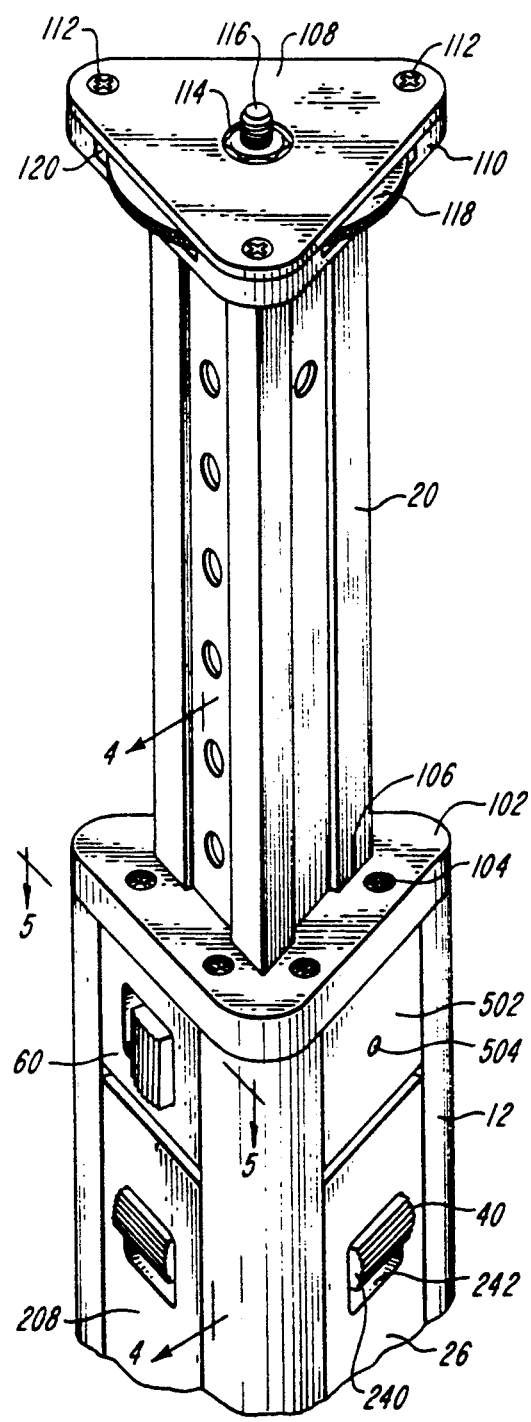
FIG. 2 is a partial perspective view of the tripod of FIG. 1.

FIG. 2 shows the telescoping neck 20 and head assembly 22 in greater detail. The column 12 includes a cap plate 102 of the same generally triangular configuration fastened to the top of the column 12 in any suitable manner, such as by screws 104. The cap plate 102 includes an opening 106 therein configured with the same the cross-sectional shape as the neck 20, thereby allowing the neck 20 to telescope in and out of the column 12 in a longitudinal direction with minimal sideways movement. Head assembly 22 at the top of the neck 20 comprises an upper mounting plate 108 and a lower plate 110 attached to one another in any suitable manner, such as with screws 112. A hole 114 is provided in the center of the top plate 108. A mounting screw 116 extends through the hole 114 for insertion into a correspondingly threaded hole in a camera or other apparatus to be supported on the tripod. The mounting screw 116 is integrally formed with a thumb wheel 118. The lower plate 110 includes recesses 120 formed in each of the three sides thereof to provide slots through which the thumb wheel 118 extends. Rotation of the thumb wheel 118 rotates the mounting screw 116 for attachment to a camera or other apparatus.

The thumb wheel 118 may also include a further mounting screw (not shown) integrally formed therewith and extending oppositely from the screw 116. The further mounting screw may be formed with a thread size different from the screw 116. The upper mounting plate 108 may be removed, as, for example, by removing screws 112, and the thumb wheel 118 may be reversed so that the further mounting screw extends upward. In this manner, the tripod may accommodate two sizes of mounting screws.

Figure 3:
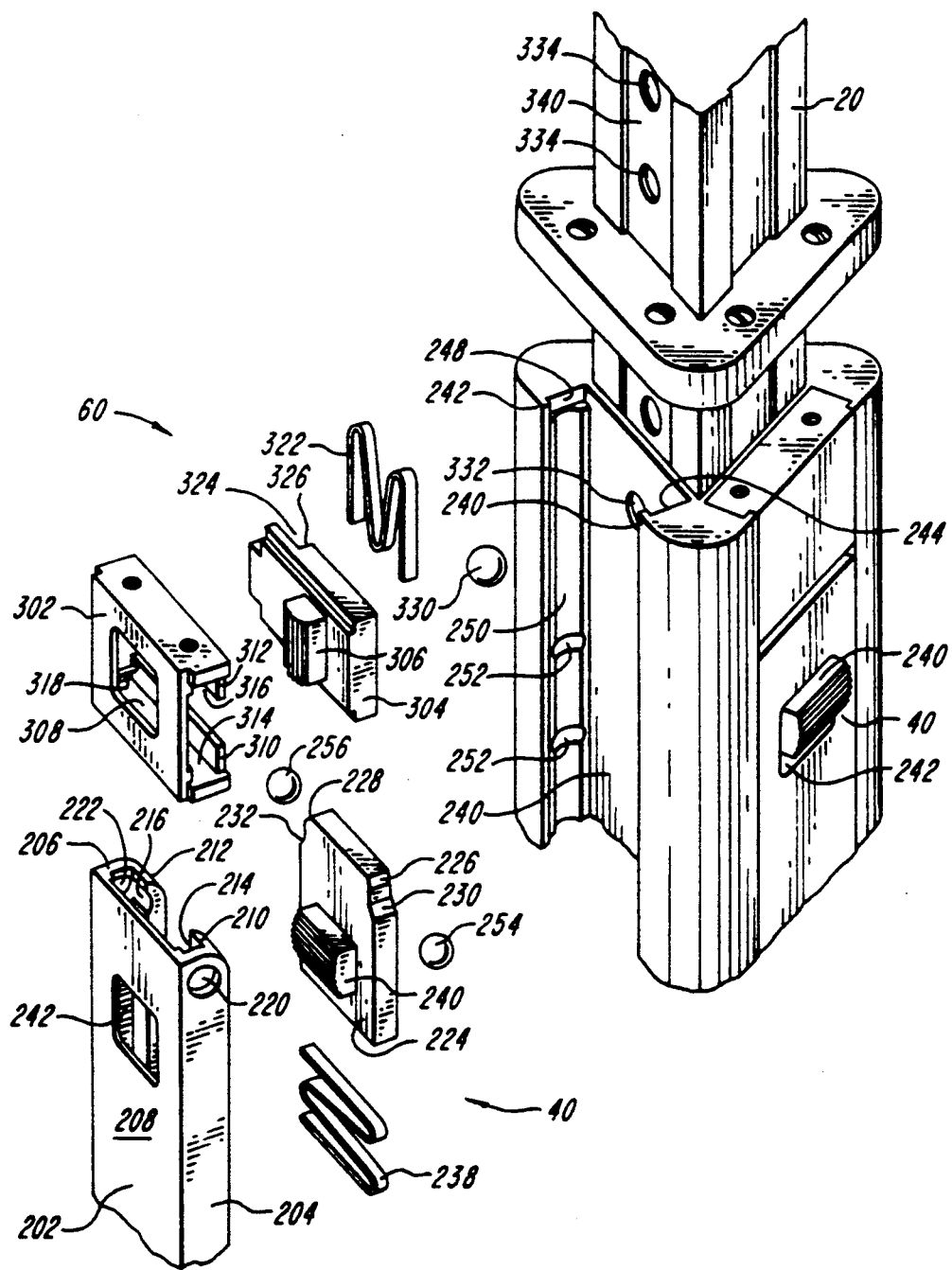
FIG. 3 is an exploded perspective view of the tripod of FIG. 2 showing the latch mechanisms of the present invention.
Figure 4:
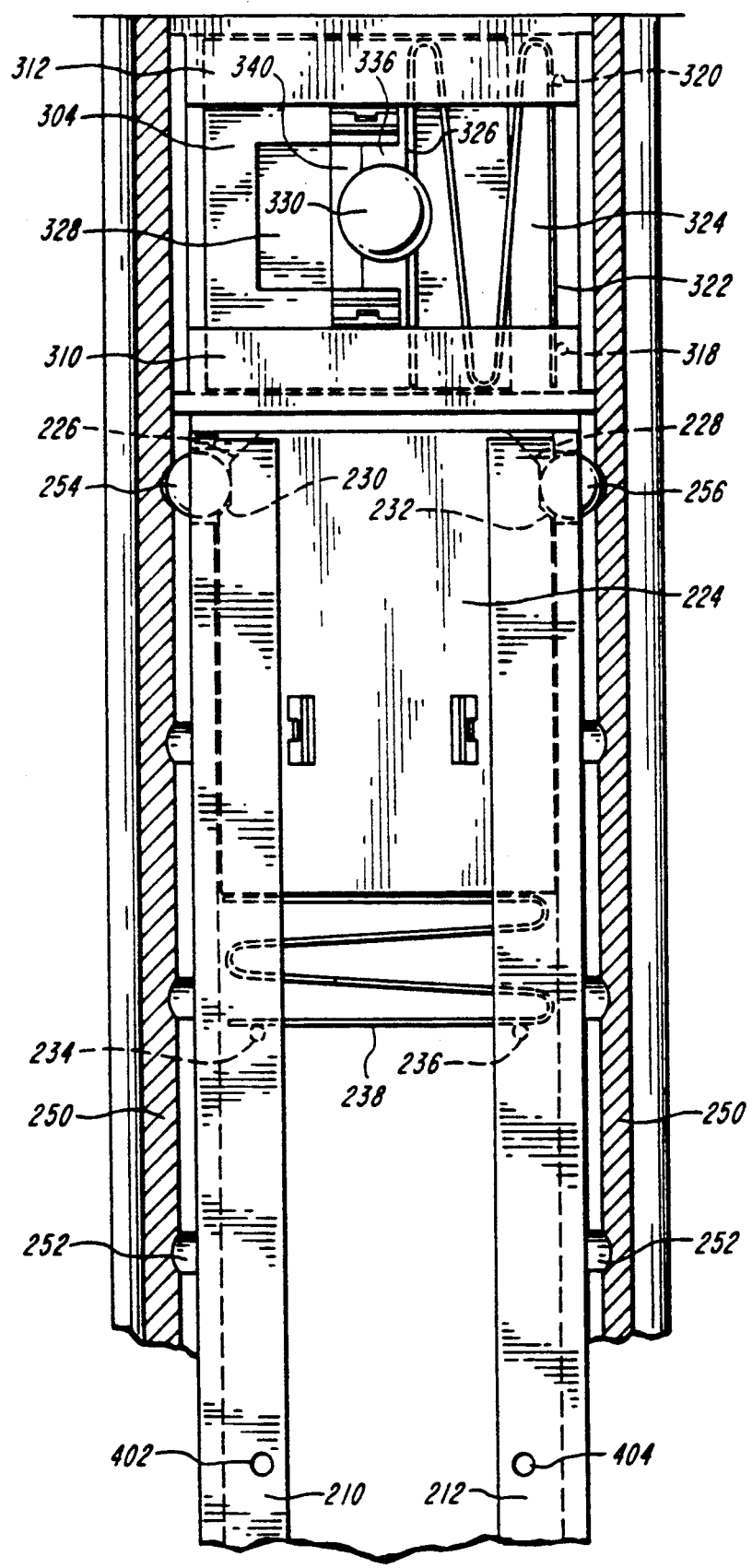
FIG. 4 is a cross-sectional view taken along line 4—4 of FIG. 2.
Figure 6:
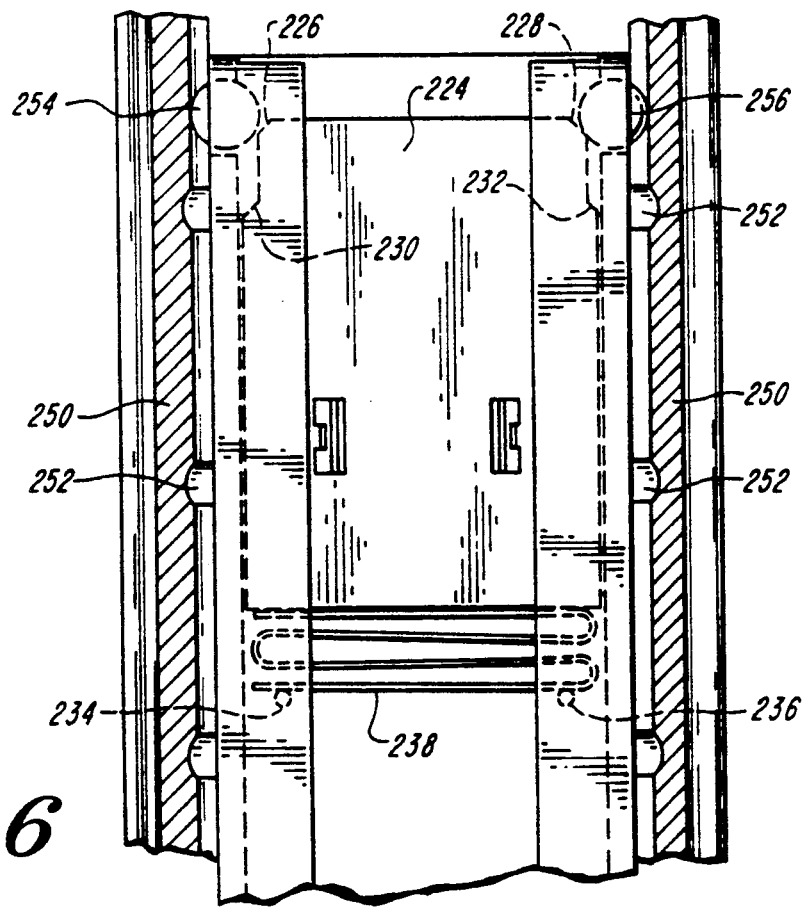
FIG. 6 is a cross-sectional view similar to FIG. 4 showing the latch mechanism in an unlatched position.

The first latching mechanism 40 for latching the leg assemblies into position around the sides of the column is shown in greater detail in FIGS. 3, 4, and 6. Each leg member 24 is generally channel-shaped, having a first longitudinal member 202 and two angled members 204, 206. The surface 208 of member 202 presents an outer surface of the leg member 26 and lies flush with the side of the central column 12 when the leg assembly 24 is in the collapsed position, thereby providing a compact and aesthetically pleasing package.

A pair of inwardly extending opposed lips 210, 212 extend from the members 204,206 to form two longitudinal recesses or tracks 214,216. Holes 220,222 are placed through angled members 204,206, respectively, near the top of leg member 26. First latching block 224 fits slidably within tracks 214,216. The top of latching block 224 includes a first pair of angled shoulders 226,228 and a second pair of angled shoulders 230,232. A pair of pins 234,236, as best seen in FIGS. 4 and 6, are disposed transversely across tracks 214,216, respectively. A spring 238 rests upon pins 234,236. The latching block 224 is supported on the spring 238 which biases the latching block 224 in an upward direction, as shown in FIG. 4.

Protrusion 240 on latching block 224 extends through a slot 242 within the longitudinal member 202 of the leg member 26. The slot 242 is slightly wider than the protrusion 240 to allow the latching block 224 to move longitudinally along the length of the leg member 26 by a distance determined by the dimensions of slot 242 and protrusion 240. Protrusion 240 is ribbed to provide a surface which can be readily pushed by hand to move the latching block down against the force of the biasing spring 238 to unlatch the first latching mechanism.

The column 12 of the tripod includes a channel 34 formed in each side thereof. A pair of opposed lips 240,242 define a pair of longitudinal recesses 244,248 within the channel 34. A track element 250 is mounted within each recess 244,248. Each track element includes a series of detents 252 disposed in opposed pairs along the longitudinal length of the track element 250. Each pair of opposed detents 252 is alignable with the holes 220,222 in the top of the leg member 26. Ball bearings on locking balls 254,256 sized to fit within holes 20,222 and detents 252 are provided.

To latch the leg member, the ball bearings 254,256 rest on the lower shoulders 230,232 of the latching block 224 and extend through the holes 220,222 in the top of the leg member and into a pair of opposed recesses 252 in the track element 250 in the recesses 244,248 of the channel 34 in the column 12. The biasing force exerted by the spring 238 keeps the latching block 224 and the ball bearings 254,256 in place. Translational movement of the leg member along the channel 34 is thereby prevented, although the leg member is rotatable about the ball bearings 254, 256 when the ball bearings rest in the recesses 252.

To unlatch the leg member, the protrusion 240 is pushed downwardly against the force of the biasing spring 238 which lowers the shoulders 230,232, and the ball bearings 254,256 drop down onto the shoulders 226,228 of the latching block 224. With the latching block held in the depressed position against the force of the biasing spring, the leg 26 can be slid up or down within the channel 24 on the side of the tripod. The ball bearings 254,256 ride within the track elements 250 and extend through holes 220,222 in the leg member 26 to prevent the leg member from pulling out of the channel. When the leg is located in the approximate appropriate position on the column, the force on the latching block is released and the biasing spring pushes up on the latching block causing the ball bearings 254,256 to snap into position in the nearest pair of opposed detents 252, thereby locking the top of the leg member into position along the column.

Figure 5A:
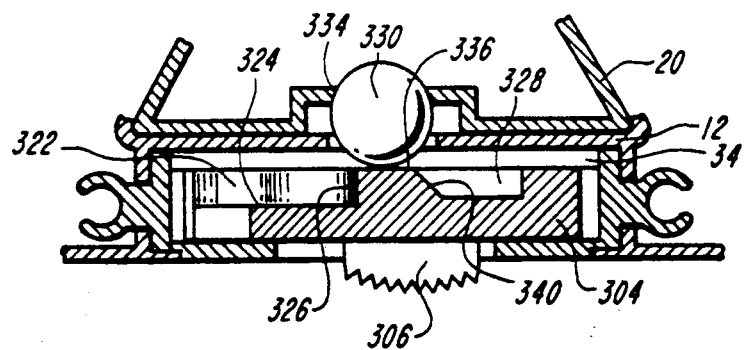
FIG. 5A is a cross-sectional view taken along line 5—5 of FIG. 2 showing the latch mechanism in a latched position.
Figure 5B:
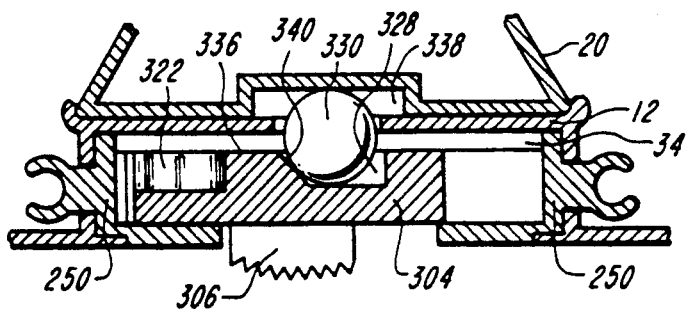
FIG. 5B is a cross-sectional view taken along line 5—5 of FIG. 2 showing the latch mechanism in an unlatched position.

The third latching mechanism 60 associated with the telescoping neck 20 is described more particularly with reference to FIGS. 3, 4, and 5. The latching mechanism includes a housing member 302 which is mounted within the channel 34 on the side of the column 12 via screws 104 which extend through cap plate 102. A latching block 304 is mounted within the housing member 302 for translational movement in a direction perpendicular to the longitudinal direction of the channel 34. A protrusion 306 extends from the latching block 304 through a slot 308 on housing 302 to allow a force to be exerted on the latching block.

The housing member 302 includes opposed lips 310,312 to define tracks 314,316. The latching block is slidable with these tracks. Pins 318,320 extend transversely across the tracks at one end of the housing member 302. A biasing spring 322 is supported against the pins 318,320. The latching block 304 includes a first recess 324 for receiving the biasing spring. Face 326 is provided against which the biasing spring abuts.

A second recess 328 is further provided in the latching block 304 for receiving a locking ball or ball bearing 330. A hole 322 is provided at the top of the channel 34 in the column 12. A series of holes 334 are provided along the neck 20. The hole 332 at the top of the channel 34 is alignable with a selected one of the holes 334 in the neck 20. When the latching block 304 is in the latched position, the ball bearing 330 extends through the hole 332 in the channel 34 and into one of the holes 334 in the neck 20. The ball bearing rests against a face 336 of the latching block 304.

When the latching block 304 is pushed against the force of the biasing spring 322, the recess 328 in the latching block is moved adjacent to the ball 330 and the ball drops into this recess and out of the hole 334 in the neck 20. In this manner, the neck can be moved to any desired position. The neck includes a track 338 in which the ball 330 rides as the neck is adjusted to the desired height. To relock the neck, the latching block is released and the ramped surface 340 pushes the ball 330 up to the face 336 and into the desired hole 334 in the neck 20.

Figure 7A:
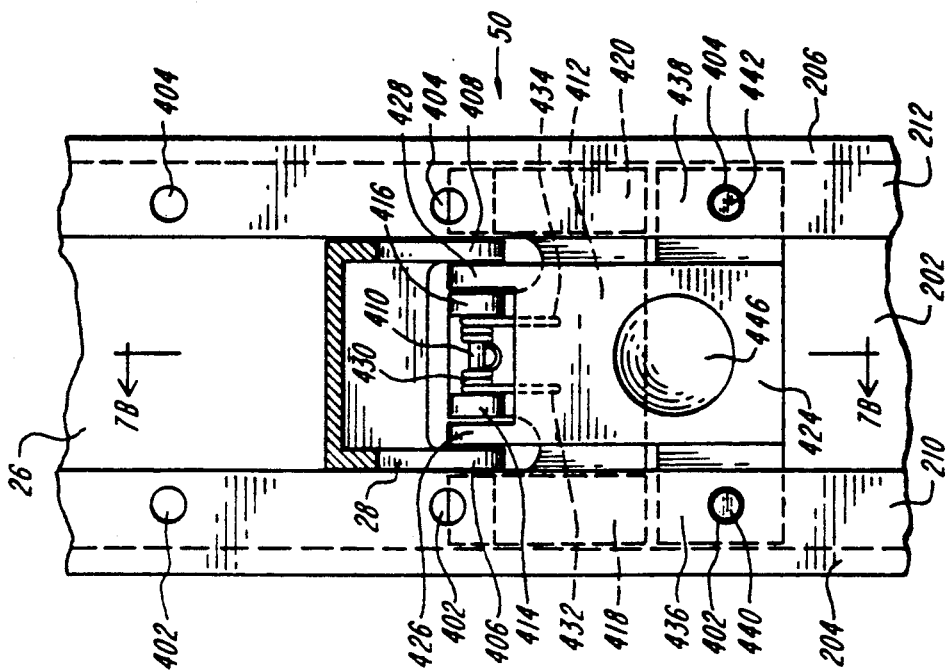
FIG. 7 is a view of the latch mechanism associated with each brace in a latched position.
FIG. 7B is a cross-sectional view of the latch mechanism of FIG. 7A taken along line 7B.
Figure 7B:
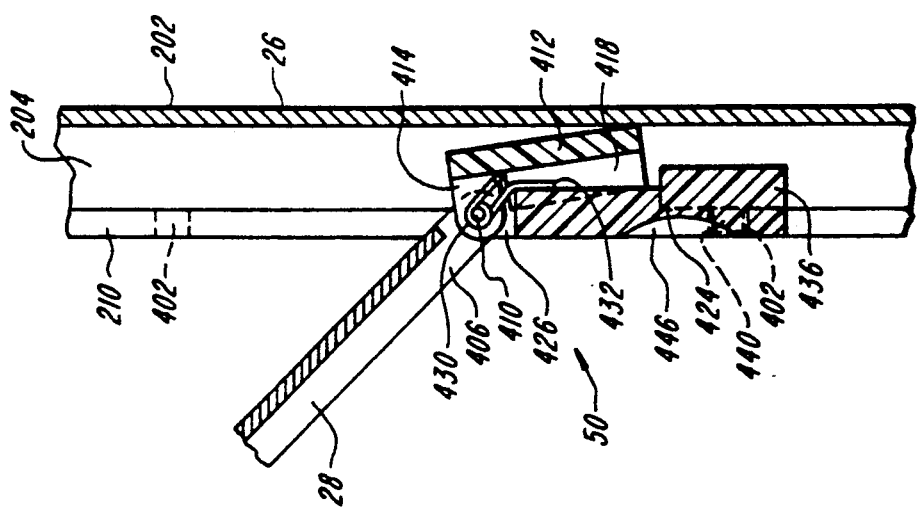
Figure 8A:
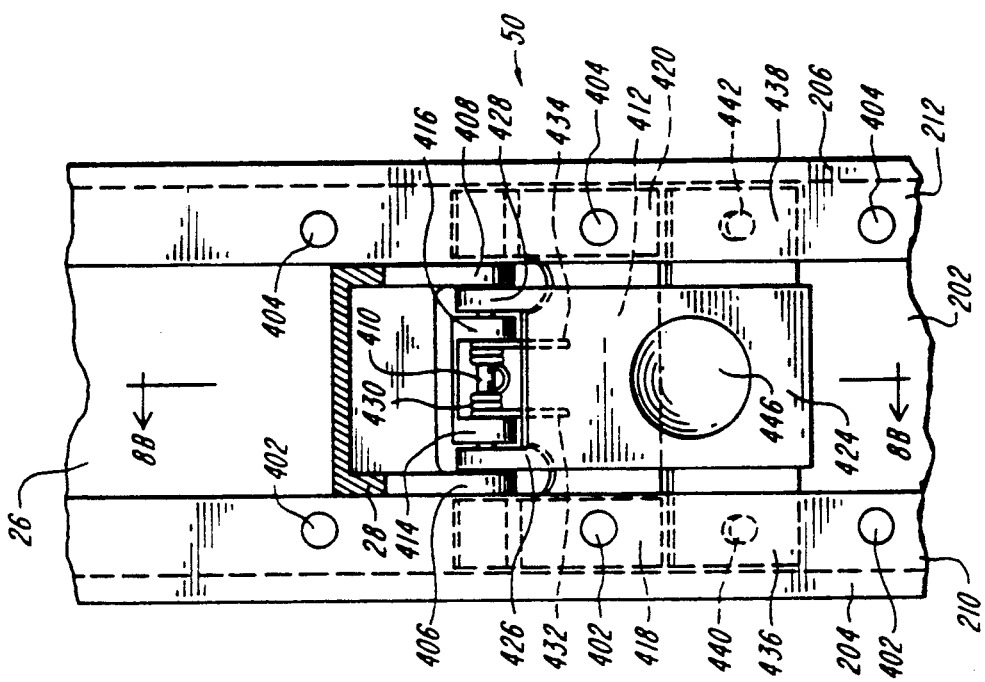
FIG. 8A is a view of the latch mechanism associated with each brace in an unlatched position.
Figure 8B:
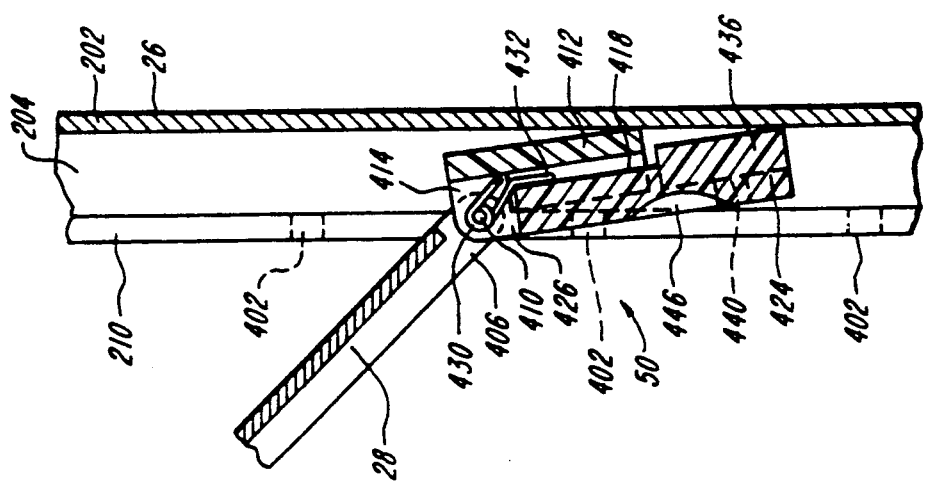
FIG. 8B is a cross-sectional view taken along line 8B—8B of FIG. 8A.

FIGS. 7 and 8 show the second latching mechanism 50 associated with the brace member 28 in more detail. The opposed lips 210,212 of the leg member 26 include a series of holes 402,404 aligned in opposed pairs along the length of the leg. The brace 28 is channel-shaped for strength and resistance to twisting. At one end, the brace includes two rounded extensions 406,408. A pivot pin 410 extends through holes in the extensions 406,408, allowing the brace to rotate about the axis of the pin 410. A tracking block 412 is also pivotably mounted on pin 410 via extensions 414,416. The tracking block extends from the angled member 204 to the angled member 206 of the leg and also includes further extensions 418,420 which abut against lips 210,212 of the leg member 26. In this manner, the tracking block is able to ride smoothly along the channel of the leg member 26.

A latching block 424 is also pivotably mounted on the pivot pin 410 via extensions 426,428. A spring 430 is coiled around the pivot pin 410 and includes two extended ends 432,434 which extend against the latching block 424 and exert a force on the latching block in a direction outwardly of the channel, biasing the latching block against the lips 210,212 of the leg member. The latching block includes two laterally extending wing members 436,438. Each member includes a small cylindrically-shaped protrusion 440,442 which is alignable with a hole 402,404 on the lip 210,212 of the leg member 26. When these protrusions 440,442 are inserted into associated holes, the brace 28 is latched into position at that location on the leg member 26. The biasing force exerted by the spring 430 keeps the protrusions within the holes on the leg. The latching block 424 includes a thumb recess 446 so that the latching block can be pushed inward to remove the protrusions from the holes, thereby releasing the latching block and allowing the brace member to be slid along the channel of the leg member.

As described earlier, the first latching mechanism 40 allows the top of the leg member 26 to pivot about the ball bearings or locking balls 254, 256 when the leg member is latched into position to prevent translational movement along the channel 34. In this manner, the leg member 26 can be rotated about an axis while the brace 28 is adjusted to the desired position.

Referring again to FIGS. 1 and 2, the tripod preferably includes blocks 502 at the upper end of the central column 12, which are similar in appearance to housing member 302, but which do not house a latching mechanism for the neck. A hole 504 may be provided in blocks 502 for use in attaching a carrying strap to the tripod by, for example, a quick release pin. A similar hole 506 may be provided near the foot 32 of each leg member 26 for use in attaching the other end of the carrying strap.

The invention is not to be limited by what has been particularly shown and described, except as indicated in the appended claims.

We claim:
1. A tripod, comprising:
a central column having three longitudinal channels formed in an outer surface of the column, and three leg assemblies collapsible to a closed position within a respective channel;
a series of spaced predetermined discrete leg locking positions within each channel;
each leg assembly comprising a leg member and a brace, each leg member being slidable along a respective channel in the column, each leg member further having a series of spaced predetermined discrete brace locking positions, each brace being pivotably mounted to the column near the bottom thereof, each brace member being further slidable along the leg member;
a first latch mechanism for latching the leg member in one of the series of predetermined leg locking positions within the channel, the first latch mechanism including means for locking the leg member against translational movement along the channel while allowing rotational movement of the leg member about an axis extending across the channel and through the predetermined leg locking position at which the leg member is latched; and
a second latch mechanism for latching the brace in one of the series of predetermined brace locking positions along the leg member.

2. The tripod of claim 1 further comprising means for attaching a carrying strap.

3. The tripod of claim 1 wherein the means for locking while allowing rotation includes a ball bearing on the leg member and detents located at the predetermined leg locking positions on the channel to matably receive the ball bearing.

4. The tripod of claim 1 further comprising an extension telescopically mounted within the central column and a third latch mechanism for latching the extension in one of a series of predetermined positions extending above the top of the central column.

5. The tripod of claim 4 further comprising a mounting assembly attached at the top of the extension, wherein the mounting assembly comprises a mounting plate having a hole therethrough, a mounting screw extending through the hole, and a thumb wheel unitary with the mounting screw and extending at least partially beyond the mounting plate, whereby rotation of the thumb wheel rotates the mounting screw.

6. A tripod, comprising:
a central column having a top, a bottom, and three longitudinally extending sides, each side having a channel longitudinally formed therein;
an extension telescopically mounted within the column;
three leg assemblies, each leg assembly collapsible to a closed position within the channel of a respective side of the column, each leg assembly comprising a leg member and a brace, each leg member having a lower end comprising a foot and an upper end slidable along the channel of a respective side of the column, each leg member further having a channel formed in an underside thereof, each brace of each leg assembly having a first end pivotably mounted to a respective side of the column proximate the bottom of the column and a second end slidable along the channel of a respective leg member;
a first latch mechanism associated with each leg assembly for locking each leg member in a predetermined position within the channel of a respective side of the column, each first latch mechanism comprising a first latching block mounted proximate the upper end of the leg member for longitudinal movement between a first position within the channel of the leg member for latching the leg member and a second position within the channel of the leg member for sliding the leg member, a spring biasing the first latching block toward the first position, a pair of locking balls, the first latching block having a first pair of angled shoulders for supporting a respective one of the pair of locking balls for sliding the leg member and a second pair of angled shoulders below the first pair of angled shoulders for supporting a respective one of the pair of locking balls for latching the leg member, a pair of opposed holes proximate the upper end of the channel of the leg member, each hole for receiving a respective one of the pair of locking balls for latching the leg member, a series of opposed detents in the channel of each side of the column alignable with the holes in the channel of the leg member for receiving a respective one of the pair of locking balls for latching the leg member, a slot in the face of the leg member, and a protrusion on the first latching block extending through and translatable within the slot in the face of the leg member;

a second latch mechanism associated with each leg assembly for locking each brace in a predetermined position within the channel of a respective leg member, each second latch mechanism comprising a second latching block slidable within the channel of the leg member and pivotably mounted proximate the second end of the brace between a first position for latching the brace and a second position for sliding the brace, a locking protrusion on each side of the second latching block, a series of holes within the channel of the leg for receiving a respective locking protrusion, and a spring biassing the second latching block toward the first position for latching the brace to hold each locking protrusion within an associated hole on the channel of the leg member; and a third latch mechanism for latching the extension in a series of positions extending above the top of the column comprising a series of recesses in the extension, a hole in the column proximate the top of the column and alignable with an associated recess in the extension, a third latching bock proximate the hole on the column mounted for translational movement between a first position for latching the extension and a second position for siding the extension, a locking ball receivable within the hole on the column and receivable within a respective one of the recesses in the extension for latching the extension, a recess in the third latching bock for receiving the locking ball when the third bock is in the second position for sliding the extension, and a spring biassing the third block toward the first position for latching the extension.

* * * * *

UNITED STATES PATENT AND TRADEMARK OFFICE
CERTIFICATE OF CORRECTION

PATENT NO. : 5,222,705
DATED : June 29, 1993
INVENTOR(S) : Kahlil Gibran et al

It is certified that error appears in the above-identified patent and that said Letters Patent is hereby corrected as shown below:

Column 8, line 17, "latching bock" should read --latching block--.

Column 8, line 24, "latching bock" should read --latching block--.

Column 8, line 25, "third bock" should read --third block--.

Signed and Sealed this

Sixteenth Day of August, 1994

Attest:

BRUCE LEHMAN

*Attesting Officer*     *Commissioner of Patents and Trademarks*